(12) United States Patent
Fornof et al.

(10) Patent No.: US 7,708,793 B2
(45) Date of Patent: May 4, 2010

(54) PURGE EXHAUST PROCESSOR

(75) Inventors: William P. Fornof, Girard, PA (US);
Fred Hoffman, Columbia Station, OH (US); Leonard A. Quinn, Lagrange, OH (US); Randall W. Nichols, Westlake, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 180 days.

(21) Appl. No.: 11/846,652

(22) Filed: Aug. 29, 2007

(65) Prior Publication Data
US 2009/0056292 A1 Mar. 5, 2009

(51) Int. Cl.
*B01D 50/00* (2006.01)

(52) U.S. Cl. ............... 55/385.3; 55/309; 55/385.1; 55/385.4; 55/418; 55/428; 55/429; 55/DIG. 25; 62/470; 95/278; 96/144

(58) Field of Classification Search ............ 55/309, 55/385.1, 385.3, 385.4, 418, 428, 429, DIG. 25; 62/470; 95/278; 96/144
See application file for complete search history.

(56) References Cited

U.S. PATENT DOCUMENTS

| | | | | |
|---|---|---|---|---|
| 2,272,926 A * | 2/1942 | Squiller | ............... | 418/90 |
| 3,796,025 A * | 3/1974 | Kasten | ............... | 96/136 |
| 4,050,237 A * | 9/1977 | Pall et al. | ............... | 60/39.08 |
| 4,487,617 A * | 12/1984 | Dienes et al. | ............... | 96/113 |
| 4,668,252 A * | 5/1987 | Gerdau | ............... | 96/189 |
| 4,892,569 A | 1/1990 | Kojima | | |
| 4,898,599 A * | 2/1990 | Settlemyer | ............... | 95/92 |
| 5,002,593 A | 3/1991 | Ichishita et al. | | |
| 5,186,522 A | 2/1993 | Spencer | | |
| 5,385,592 A | 1/1995 | Maeda | | |
| 5,443,138 A | 8/1995 | Bedi et al. | | |
| 6,071,321 A | 6/2000 | Trapp et al. | | |
| 6,319,296 B1 | 11/2001 | Fornof | | |
| 6,514,051 B2 | 2/2003 | Fornof et al. | | |
| 6,527,839 B2 | 3/2003 | Fornof et al. | | |
| 6,574,986 B2 * | 6/2003 | Morimoto et al. | ............... | 62/470 |
| 6,730,143 B1 | 5/2004 | Nichols et al. | | |
| 6,786,953 B2 | 9/2004 | Fornof et al. | | |

(Continued)

FOREIGN PATENT DOCUMENTS

AT 394 167 B 2/1992

(Continued)

OTHER PUBLICATIONS

Kaeser Compressors, Condensate Management, Aquamat Series for Compressors: 10 to 3180 cfm, May 2006.

(Continued)

*Primary Examiner*—Robert J Hill, Jr.
*Assistant Examiner*—Christopher P Jones
(74) *Attorney, Agent, or Firm*—Calfee, Halter & Griswold LLP

(57) ABSTRACT

A purge exhaust processor includes an inlet chamber receiving a purge exhaust. A portion of the purge exhaust including at least one of moisture, air, and oil is passed from the inlet chamber to a sump volume. A heat source changes a phase of the moisture from liquid to gas. A wick transfers the oil from the sump volume to an oil collector.

31 Claims, 5 Drawing Sheets

U.S. PATENT DOCUMENTS

| | | |
|---|---|---|
| 6,883,321 B2 | 4/2005 | Fornof |
| 6,951,581 B2 | 10/2005 | Fornof et al. |
| 7,008,472 B2 | 3/2006 | Fornof et al. |
| 7,329,355 B1 * | 2/2008 | Burns et al. .................. 210/680 |
| 2002/0131874 A1 * | 9/2002 | Fornof et al. ................. 417/312 |
| 2002/0185009 A1 * | 12/2002 | Schlaps ....................... 96/413 |
| 2002/0189458 A1 * | 12/2002 | Fornof et al. .................. 96/134 |
| 2003/0110949 A1 * | 6/2003 | Fornof et al. .................. 96/136 |
| 2004/0016342 A1 * | 1/2004 | Fornof et al. .................. 95/117 |
| 2005/0092180 A1 | 5/2005 | Fornof et al. |
| 2006/0162778 A1 | 7/2006 | Nichols et al. |
| 2007/0277485 A1 * | 12/2007 | MacKenzie et al. ........... 55/424 |

FOREIGN PATENT DOCUMENTS

| | | |
|---|---|---|
| DE | 4228326 A1 | 3/1994 |
| JP | 01305175 A | 12/1989 |
| JP | 11343976 A | 12/1999 |

OTHER PUBLICATIONS

Tretolite, Oil Separation Technologies, Baker Hughes, from web page www.bakerhughes.com/bakerpetrolite/oilgas/tretolite/index.htm, 2006.

Untitled document from web page http://161.58.172.146.... regarding coalescing oil/water separation.

Wolfgang H. Koch, William Licht; Industrial Air Pollution Engineering/New design approach boosts cyclone efficiency; 1980 by Chemical Engineering McGraw-Hill Pub. Co., New York, N.Y., pp. 175-183.

Joaquin Casal and Jose M. Martinez-Benet; A better way to calculate cyclone pressure drop; Chemical Engineering, Jan. 24, 1983; pp. 99-100.

International Search Report on International application No. PCT/US2008/072284 for Bendix Commercial Vehicle Systems LLC, Jun. 24, 2009, 14 pages, International Searching Authority, Geneva Switzerland.

* cited by examiner

SPECIFY UNITS (U = US CUSTOMARY [IMPERIAL], M = METRIC)

|  |  |  | INPUT | WORKING |
|---|---|---|---|---|
| FLOW RATE | Q | cfm | 19.5 | 20 cfm |
| DESIGN INLET VEL | vi | fps | 50 | 50 fps |
| GAS DENSITY | rg | pcf | 0.0740 | 0.074 pcf |
| INLET AREA |  |  |  | 0.01 sf |
| PD PARAMETR |  |  |  | 0.56 in water |

DIMENSIONS

| | | | STAIRMAND HE | SWIFT HE | LAPPLE LE | SWIFT LE | PETERSON / WHITBY LE |
|---|---|---|---|---|---|---|---|
| DIA | D | ft | 0.25 | 0.27 | 0.23 | 0.23 | 0.23 |
| INLET HT | a | in | 1.53 | 1.40 | 1.37 | 1.37 | 1.62 |
| INLET WIDTH | b | in | 0.61 | 0.67 | 0.68 | 0.68 | 0.58 |
| OUTLET LENGTH | S | ft | 0.13 | 0.13 | 0.14 | 0.14 | 0.13 |
| OUTLET DIA | De | in | 1.53 | 1.27 | 1.37 | 1.37 | 1.39 |
| CYLINDER HT | h | ft | 0.38 | 0.37 | 0.46 | 0.40 | 0.31 |
| OVERALL HT | H | ft | 1.02 | 1.03 | 0.91 | 0.86 | 0.73 |
| DUST OUTLET DIA | B | in | 1.15 | 1.27 | 0.68 | 1.09 | 1.39 |
| #VEL HDS | Nh |  | 5.14 | 4.87 | 4.49 | 4.69 | 4.77 |
| PRESS DROP, NO NV |  | in water | 2.85 | 2.70 | 2.49 | 2.60 | 2.65 |
| PRESS DROP, WITH NV |  | in water | 1.34 | 1.27 | 1.17 | 1.22 | 1.24 |

CYCLONE DATA FROM "NEW DESIGN APPROACH BOOSTS CYCLONE EFFICIENCY",
W.H. KOCH AND W. LICHT, CHEM ENG NOV 7 1977, 80
PRESSURE DROP VEL HEAD CORRELATION FROM "A BETTER WAY TO CALCULATE
CYCLONE PRESSURE DROP" J. CASAL AND J.M. MARTINEZ-BENET, CHEM ENG JAN 24,1983,99

FIG. 6

| 0.5 sec | 1.0 sec | | DURATION OF INITIAL PURGE |
|---|---|---|---|
| 39 | 19.5 | scfm | STANDARD AIR FLOW |
| 0 | 0 | psig | AIR PRESSURE |
| 14.7 | 14.7 | psia | AIR ABSOLUTE PRESSURE |
| 39.00 | 19.50 | acfm | ACTUAL VOLUMETRIC AIR FLOW |
| 1123.2 | 561.6 | in3/sec | CUBIC INCHES PER SECOND |
| 0.8 | 0.6 | inch | SLOT WIDTH |
| 2 | 1.5 | inch | SLOT LENGTH |
| 1600 | 0.900 | in2 | SLOT AREA |
| 702 | 624 | in/sec | AIR VELOCITY |
| 58.5 | 52.0 | ft/sec | AIR VELOCITY |
| 4 | 3 | inch | CYCLONE INSIDE DIAMETER |
| 6 | 5 | inch | CYCLONE LENGTH |
| 75.40 | 36.34 | in3 | CYCLONE VOLUME |
| 1.29 | 0.68 | sec | AIR RETENTION TIME |
| 1.6 | 1.2 | inch | MEAN AIR ROTATION RADIUS |
| 439 | 520 | rad/sec | ANGULAR VELOCITY |
| 4190 | 4966 | RPM | ROTATIONAL VELOCITY |
| 25667 | 27040 | ft/sec2 | CENTRIFUGAL FORCE |
| 798 | 840 | g | CENTRIFUGAL FORCE |

PURGE EXHAUST PROCESSOR

BACKGROUND

The present invention relates to a compressed air dryer. It finds particular application in conjunction with reducing oil expelled to atmosphere when the air dryer is purged and will be described with particular reference thereto. It will be appreciated, however, that the invention is also amenable to other applications.

The purge exhaust of a compressed air regenerative dryer used on air braked vehicles normally consists of water mixed with trace amounts of oil. The oil may be introduced into the air dryer from the compressor. The water and oil are expelled from purge exhaust valve during a purge cycle of the air dryer. More specifically, the water and oil are expelled to atmosphere. Exhausting oil to atmosphere is undesirable. In addition, the oil tends to accumulate over time around the purge exhaust valve. This oil accumulation frequently leads customers to incorrectly believe the compressor is prematurely worn resulting in unnecessary compressor replacement.

Currently, compressed air condensate management separators including baffles and coalescing elements are used to separate oil and emulsions from the condensate water of industrial compressed air systems. However, these separators tend to be bulky and are typically designed for stationary industrial compressed air applications—not suitable to be mounted on motor vehicles.

The present invention provides a new and improved apparatus and method which addresses the above-referenced problems.

SUMMARY

In one aspect of the present invention, a purge exhaust processor includes an inlet chamber receiving a purge exhaust. A portion of the purge exhaust including at least one of moisture, air, and oil is passed from the inlet chamber to a sump volume. A heat source changes a phase of the moisture from liquid to gas. A wick transfers the oil from the sump volume to an oil collector.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 6 presents various cyclone dimensions for a set input flow rate with a set inlet velocity and a set gas density; and FIG. 7 presents ranges of various parameters for both a 0.5 sec initial purge duration and a 1.0 sec initial purge duration.

DETAILED DESCRIPTION OF ILLUSTRATED EMBODIMENT

Figure 1:
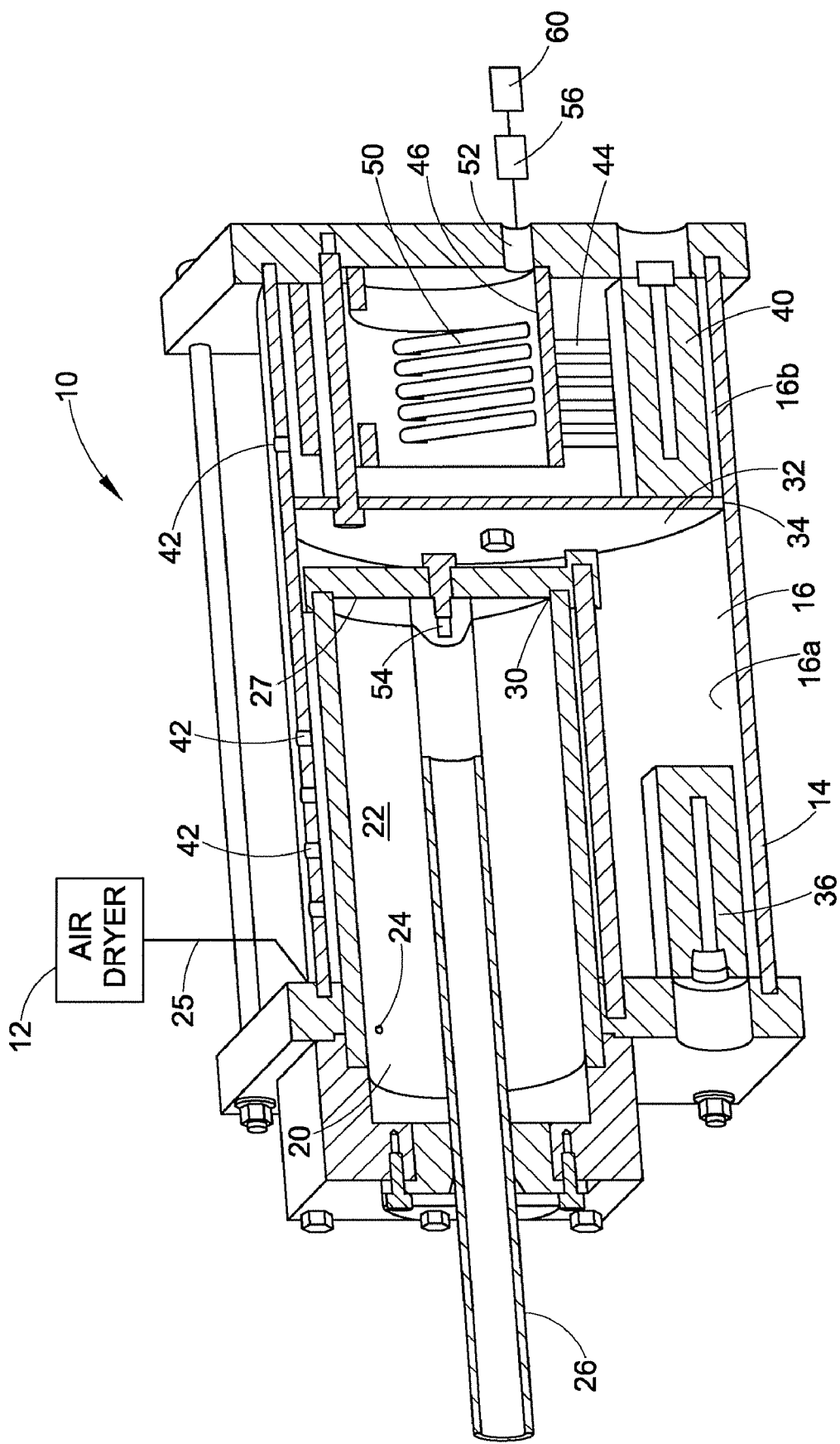
FIG. 1 illustrates a purge exhaust processor in accordance with one embodiment of an apparatus illustrating principles of the present invention.

With reference to FIG. 1, an exemplary separator 10 (purge exhaust processor) is illustrated for processing an exhaust from, for example, an associated air dryer 12 on a heavy vehicle. In one embodiment, the exhaust is expelled from the air dryer 12 during a purge cycle and, therefore, is referred to here as purge exhaust. The purge exhaust typically includes at least one of air, moisture, and oil.

The separator 10 includes a first housing 14, which defines a sump volume 16, and a second housing 20, which defines an inlet chamber 22. An inlet port 24 is included in the inlet chamber 22 for receiving the purge exhaust from the air dryer 12 via an air line 25. The inlet chamber 22 fluidly communicates with atmosphere via an air outlet port 26 (outlet tube). One end of the inlet chamber 22 is defined by an end-plate 27 having an inlet chamber passage 30, which provides fluid communication between the inlet chamber 22 and the sump volume 16. In the illustrated embodiment, the second housing 20 defining the inlet chamber 22 is positioned substantially within the first housing 14 defining the sump volume 16. However, other embodiments including other configurations (see, for example, FIG. 3) are also contemplated.

A divider 32 is positioned in the sump volume 16 to define a first sump sub-volume 16a and a second sump sub-volume 16b. A sump passage 34 is defined between the first and second sump sub-volumes 16a, 16b, respectively. In the embodiment illustrated in FIG. 1, the sump passage 34 is between an outer diameter of the divider 32 and an inner diameter of the first housing 14 defining the sump volume 16. A first heat source 36 (e.g., a heater or warming element) is positioned in the first sump sub-volume 16a, and a second heat source 40 (e.g., a heater or warming element) is positioned in the second sump sub-volume 16b. Orifices 42 in the first housing 14 act as vents in the sump volume 16.

An oleophilic filament 44 is positioned in the second sump sub-volume 16b. An internal oil collector 46 is positioned in the second sump sub-volume 16b for receiving oil from the oleophilic filament 44. In one embodiment, the oleophilic filament 44 is a polypropylene fiber (wick) that has an affinity for oil. A capillary action is created by an attraction between the oleophilic filament 44 and the oil. In one embodiment, a tubing 50 surrounds at least a portion of the oleophilic filament 44 and increases the capillary action between the oleophilic filament 44 and the oil for disengaging the oil from the wick 44.

An oil outlet port 52 in the first housing 14 provides a passage through the first housing 14 of the sump volume 16.

During use, when the associated air dryer 12 enters a purge cycle, the exhaust (e.g., purge exhaust) is transferred from a purge outlet port of the air dryer 12 to the inlet chamber 22 via the inlet port 24. The purge exhaust is typically expelled from the air dryer, and enters the inlet port 24, with a significant amount of force. In one embodiment, the inlet chamber 22 is configured to include a substantially cylindrical inner wall. In addition, the inlet port 24 is configured to introduce the purge exhaust into the inlet chamber 22 along a path that is substantially tangential to the inner wall of the inlet chamber 22. The purge exhaust is typically introduced into the inlet chamber 22 at a relatively high velocity. Therefore, a cyclonic or centrifugal force is created that swirls the purge exhaust along the inner wall of the inlet chamber 22. A spike 54 helps maintain a vortex of the cyclonic swirl centered in the inlet chamber 22.

The cyclonic swirl facilitates separating the relatively lighter material(s) (e.g., air) from the relatively heavier material(s) (e.g., moisture and oil) in the purge exhaust. A first portion of the exhaust including the relatively lighter material(s) (e.g., air) exits the inlet chamber 22 via the air outlet port 26 while a second portion of the exhaust including the relatively heavier material(s) (e.g., moisture and oil) is forced to inner walls of the inlet chamber 22.

Figure 2:
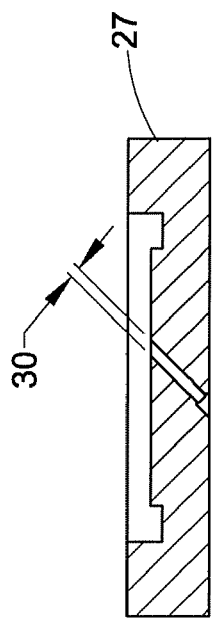
FIG. 2 illustrates an end-plate in accordance with one embodiment of an apparatus illustrating principles of the present invention.

The relatively heavier material(s) (e.g., moisture and oil) in the second portion of the purge exhaust are passed from the inlet chamber 22 to the sump volume 16 (e.g., the first sump sub-volume 16a) via the inlet chamber passage 30. In one embodiment, the inlet chamber passage 30 is angled (e.g., between about 25° and about 65°) in a direction away from the swirling exhaust. The angled inlet chamber passage 30 facilitates only passing the heavier materials (e.g., the moisture and oil) from the inlet chamber 22 to the sump volume 16. In addition, the materials passed from the inlet chamber 22 to the sump volume 16 is also determined as a function of a diameter of the inlet chamber passage 30 and a thickness of the end-plate 27. In that regard, a trade-off exists between an inlet chamber passage having a diameter that is too large—in which case too much air would escape from the inlet chamber 22—and a passage having a diameter that is too small—in which case the chance that the inlet chamber passage may become clogged with oil and/or moisture increases. With reference to FIG. 2, in one embodiment the inlet chamber passage 30 in the end-plate 27 is angled at about 45° from the swirling exhaust and has a diameter of about 0.12".

Once the moisture and oil are in the first sump sub-volume 16a, the first heater element 36 heats the moisture to change the phase of the moisture from liquid to gas. In other words, the first heater element 36 evaporates the moisture through, for example, boiling. The gaseous moisture is vented to atmosphere from the sump volume 16 via the orifices 42. At this point, substantial amounts of the air and moisture in the second portion of the purge exhaust have been eliminated, leaving substantially only the oil.

The remaining liquid from the purge exhaust (including mostly oil with some small amounts of air and moisture), passes from the first sump sub-volume 16a to the second sump sub-volume 16b via the sump passage 34. The second heater element 40 evaporates additional moisture from the purge exhaust. The additional gaseous moisture is vented to atmosphere from the sump volume 16 via the orifices 42. The oleophilic filament 44 transfers the oil from a bottom portion of the second sump volume 16b to the internal oil collector 46. More specifically, the oil is wicked-up by a first end of the oleophilic filament 44. The oil is then transferred from a second end of the oleophilic filament 44 onto the internal oil collector 46 via, for example, a dripping action.

The wicked-up oil is transferred from the internal oil collector 46 to an external oil collector 56, which is outside of the sump volume 16, through the oil outlet port 52 via, for example, gravity. Therefore, the oleophilic filament 44 acts as a means for transferring the oil from the sump volume 16 to the oil collectors 46, 56. The oil in the external oil collector 56 is disposed of in an environmentally proper manner. Alternatively, as discussed in more detail below, the oil in the external oil collector 56 is recycled to, for example, a compressor or crankcase 60 on the vehicle.

Because the first and second heating elements 36, 40 change the moisture in the purge exhaust from a liquid phase to a gaseous phase, the heating elements 36, 40 act as means for changing a phase of the moisture in the purge exhaust. The heating elements 36, 40 may be conventional electric heaters or may use or transfer heat generated by other vehicle systems to a suitable location in the sump areas.

Figure 3:
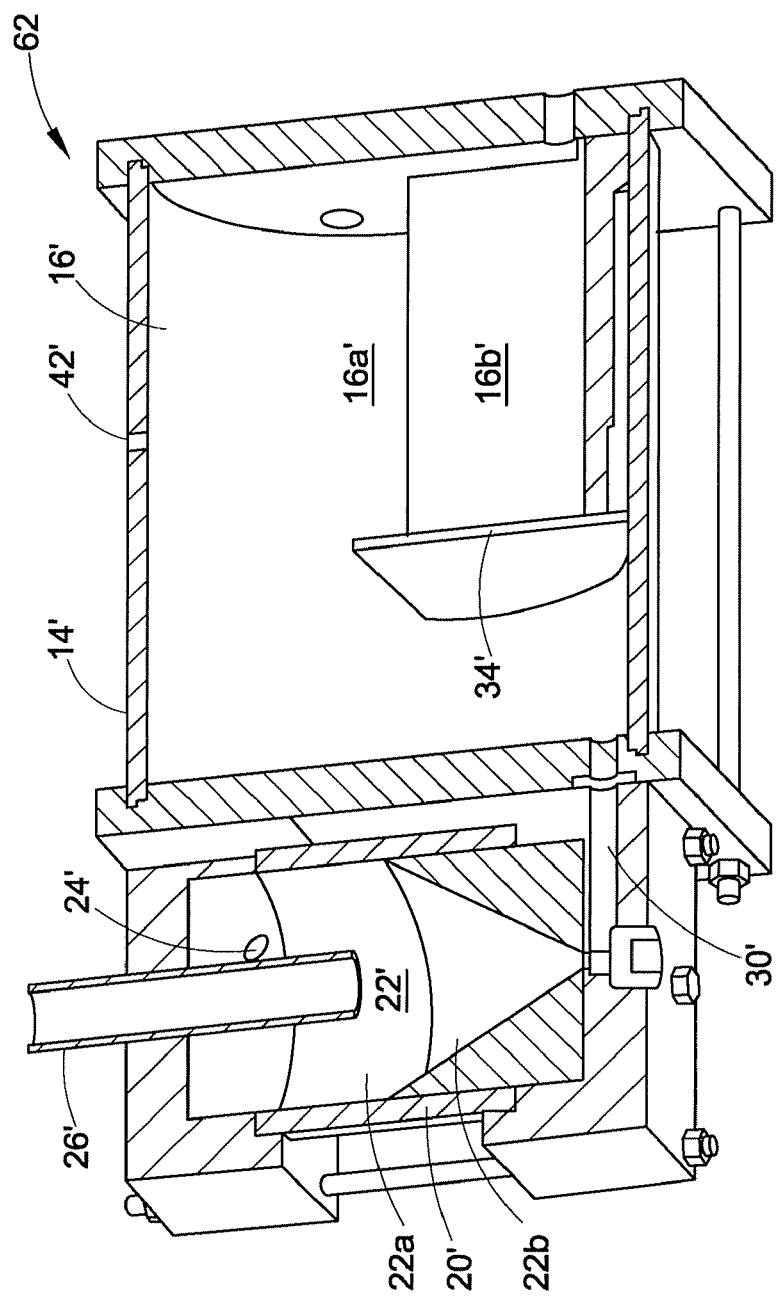
FIG. 3 illustrates a purge exhaust processor in accordance with another embodiment of an apparatus illustrating principles of the present invention.

With reference to FIG. 3, another embodiment of an exemplary separator 62 is illustrated for processing purge exhaust. For ease of understanding this embodiment of the present invention, like components are designated by like numerals with a primed (') suffix and new components are designated by new numerals.

In the embodiment illustrated in FIG. 3, the first housing 14', which defines the sump volume 16', and the second housing 20', which defines the inlet chamber 22', are in a side-by-side configuration (unlike the first embodiment illustrated in FIG. 1 in which the second housing 20 is positioned substantially within the first housing 14).

With reference to FIG. 3, a first portion 22a of the inlet chamber 22' is configured to include a substantially cylindrical inner wall while a second portion 22b of the inlet chamber 22' is configured to include angled inner walls. As in the embodiment discussed above, the inlet port 24' is configured to introduce the purge exhaust into the inlet chamber 22' along a path that is substantially tangential to the inner wall of the first portion 22a of the inlet chamber 22'. Therefore, a cyclonic or centrifugal force is created that swirls the purge exhaust along the inner wall of the first portion 22a of the inlet chamber 22'. The angled inner walls of the second portion 22b of the inlet chamber 22' help maintain a vortex of the cyclonic swirl centered in the inlet chamber 22'.

The cyclonic swirl facilitates separating the relatively lighter material(s) (e.g., air) from the relatively heavier material(s) (e.g., moisture and oil) in the purge exhaust. The first portion of the exhaust including the relatively lighter material(s) (e.g., air) exits the inlet chamber 22' via the air outlet port 26' while the second portion of the exhaust including the relatively heavier material(s) (e.g., moisture and oil) are forced to inner walls of the inlet chamber 22'.

The second portion of the exhaust including the relatively heavier material(s) (e.g., moisture and oil) is passed from the inlet chamber 22' to the sump volume 16' (e.g., the first sump sub-volume 16a') via the inlet chamber passage 30'. As in the embodiment illustrated in FIG. 1, once in the first sump sub-volume 16a', the first heater element (not shown in FIG. 3) evaporates moisture from the purge exhaust, and the gaseous moisture is vented to atmosphere from the sump volume 16' via the orifices 42'. At this point, substantial amounts of the air and moisture in the second portion of the purge exhaust have been eliminated, leaving substantially only the oil.

The remaining purge exhaust (including mostly oil with some small amounts of air and moisture), passes from the first sump sub-volume 16a' to the second sump sub-volume 16b' via the sump passage 34'. Because operation of the oleophilic filament is the same as described above with reference to the embodiment illustrated in FIG. 1, a cut-away view of the second sub-volume 16b' is not illustrated in FIG. 3. Once the oil is transferred by the oleophilic filament, the oil exits the second sump volume 16b' via the oil outlet port 52'.

Figure 4:
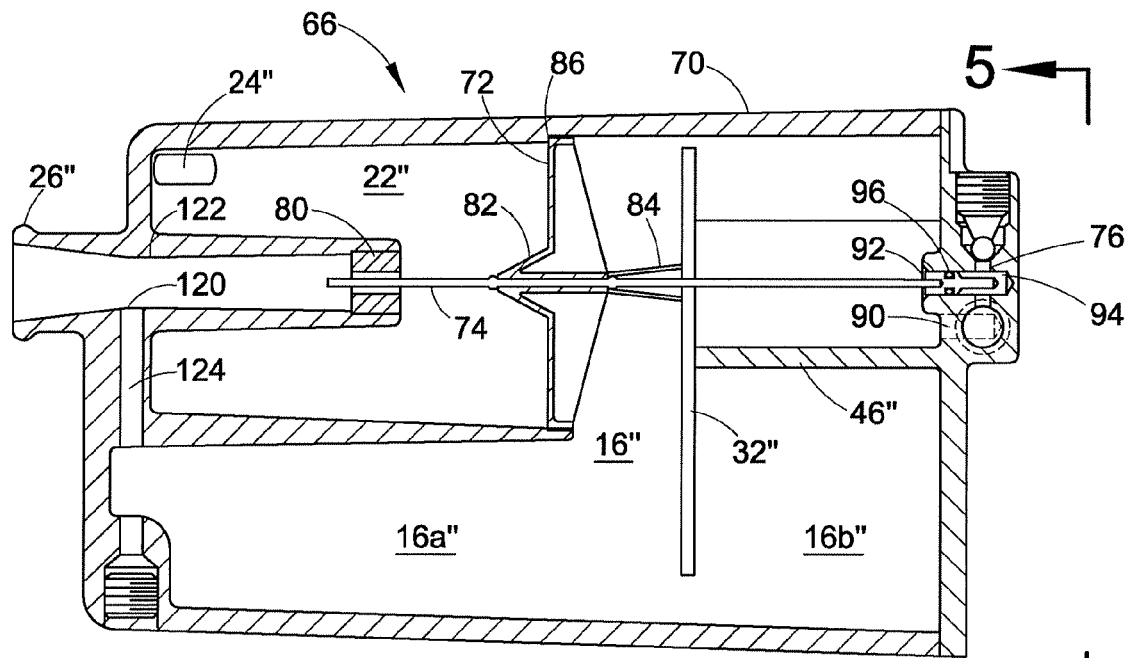
FIG. 4 illustrates a purge exhaust processor in accordance with another embodiment of an apparatus illustrating principles of the present invention.

With reference to FIG. 4, another embodiment of an exemplary separator 66 is illustrated for processing purge exhaust. For ease of understanding this embodiment of the present invention, like components are designated by like numerals from FIG. 1 with a double-primed (") suffix and new components are designated by new numerals.

With reference to FIG. 4, a housing 70 defines the inlet chamber 22" and the sump volume 16". In the illustrated embodiment, a movable piston 72 separates the inlet chamber 22" from the sump volume 16". A push-rod 74 extends in one direction from the piston 72, through the divider 32", and into an oil transfer (pump) orifice 76. The push-rod 74 extends in a second direction (which is substantially opposite to the first direction) from the piston 72 into a guide piece 80 in the air outlet port 26". As in the embodiment illustrated in FIG. 1, the inlet chamber 22" is configured to include a substantially cylindrical inner wall. In addition, the inlet port 24" is configured to introduce the purge exhaust into the inlet chamber 22" along a path that is substantially tangential to the inner wall of the inlet chamber 22". Therefore, a cyclonic or centrifugal force is created that swirls the purge exhaust along the inner wall of the inlet chamber 22". A spiked portion 82 of the movable piston 72 helps maintain a vortex of the cyclonic swirl centered in the inlet chamber 22". A biasing means 84 (e.g., a spring) biases the piston 72 into closed engagement with a seat 86 of the inlet chamber 22".

The piston 72/seat 86 interface creates a seal may or may not be airtight. If the piston 72/seat 86 interface is not airtight, the second portion of the exhaust may pass from the inlet chamber 22" to the sump volume 16" between the piston 72 and the seat 86. During use, the burst of purge exhaust in the inlet chamber 22" creates a swirl in the inlet chamber 22" to separate the relatively heavier material(s) (e.g., oil and moisture) from the relatively lighter material(s) (e.g., air). Pressure in the inlet chamber 22" created by the burst briefly moves the piston 72 away from the biased position in the seat 86 and toward the divider 32". While the piston 72 is unseated (open), the second portion of the exhaust including the oil and moisture are passed from the inlet chamber 22" to the first sump sub-volume 16a".

Although not illustrated in FIG. 4, it is to be understood that first and second heater elements evaporate the moisture in the first and second sump sub-volumes 16a", 16b", respectively, as described above with reference to the embodiment illustrated in FIG. 1. In addition, an oleophilic filament (not illustrated in FIG. 4) is used as described above to deposit the oil on the internal oil collector 46".

Figure 5:
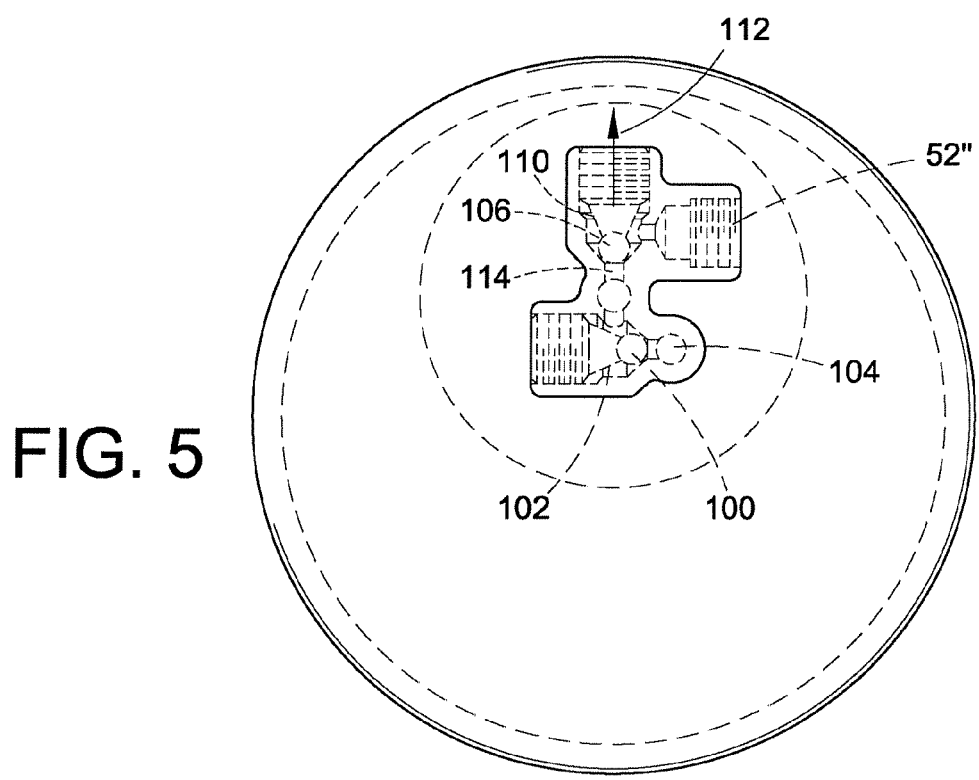
FIG. 5 illustrates a side view of the purge exhaust processor of FIG. 4 indicated along the line noted as "FIG. 5"

FIG. 5 illustrates a side view of the separator as indicated by the line noted as "FIG. 5" in FIG. 4. With reference to FIGS. 4 and 5, the oil passes from the internal oil collector 46" to a passage 90. As the piston 72 is moved by pressure in the inlet chamber 22", a tip 92 of the push-rod 74 is quickly pushed into and pulled from a cavity 94. A sealing means 96 (e.g., an o-ring) creates a seal around the push-rod 74 when the tip 92 is in the cavity 94. Pressure (e.g., air pressure) created by the tip 92 entering the cavity 94 causes a check valve 100, which is biased by a spring 102 to the illustrated position, to seat over a port 104 associated with the passage 90. At the same time, the pressure causes a check valve 106, which is biased by a spring 110 to the illustrated position, to be unseated in the direction of arrow 112. Oil in a channel 114 is then transferred (pumped) by the pressure to the oil outlet port 52". In one embodiment, the oil outlet port 52" leads to a compressor (not shown) on the vehicle. Oil transferred (pumped) to the compressor via the oil outlet port 52" is recycled to the compressor or engine. Alternatively, the oil is collected in a reservoir (not shown), which is periodically emptied.

In the illustrated embodiment, the air outlet port 26" includes an orifice 120 in a necked-down portion 122, which fluidly communicates with a moisture exhaust 124. The necked-down portion 122 creates a venturi effect that draws moisture from the exhaust passing through the air outlet port 26". It is to be understood that creating a venturi effect to draw moisture from the exhaust exiting the air outlet port 26" is an alternative to venting the moisture from the sump volume as described above with reference to FIGS. 1-3.

With reference to FIGS. 1 and 4, it is contemplated in one embodiment that the inlet port 24, 24" has a width between about 0.6" and 0.8" and a height between about 1.5" to about 2.0". In addition the inlet chamber 22, 22" has a length between about 5.0" and about 6.0" and a diameter between about 3.0" and about 4.0"; and the outlet tube 26, 26" has a diameter between about 1.5" and 2.0". The dimensions contemplated in this paragraph are arrived at according to calculations discussed below.

In general, cyclones operate in relatively steady states. In the purge type of intermittent and short duration operation, some assumptions are made regarding the volume of the cyclone that varies from standard sizing calculations. More specifically, a cartridge having a diameter of 5.38" and a length of 5.33" (for 5.0" effective length) is used to estimate the initial purge air flow (not including purge volume).

Volume is calculated as $(\pi/4)*d^2*h$ (where d is diameter and h is height). Therefore, volume is $(\pi/4)*(5.38")^2*(5.0")$ =113.7 in$^3$. It is assumed that packing material (e.g., desiccant) consumes about ½ of the volume and, therefore, the volume is ½*(113.7 in$^3$)=~57 in$^3$ at 130 psi gauge (psig). Standard volume is calculated as 57 in$^3$*((130 psig+14.7)/ 14.7)=561.0 in$^3$ (0.325 ft$^3$) at atmospheric pressure (where 14.7 is atmospheric pressure). Therefore, it is assumed 0.325 ft$^3$ represents the amount of air that is expelled during initial purge of the air dryer. If 0.325 ft$^3$ represents the volume released in 1.0 second, flow is 0.325 ft$^3$/sec(60 sec/min)=19.5 standard cubic feet per minute (scfm).

With reference to FIG. 6, various cyclone dimensions are presented for an input flow rate of 19.5 with an inlet velocity of 50 fps and a gas density of 0.0740 pcf. The "Inlet ht" and "Inlet width" correspond to the inlet port 24, 24" (see FIGS. 1 and 4), The "Outlet length" and "Outlet dia" correspond to the outlet tube 26, 26" (see FIGS. 1 and 4). The "Cylinder ht" and "Overall ht" correspond to the inlet chamber 22, 22" (see FIGS. 1 and 4), With reference to FIG. 7, ranges for various parameters are provided for both a 0.5 sec initial purge duration and a 1.0 sec initial purge duration. The "slot width", "slot, length", and "slot area" correspond to the inlet port 24, 24" (see FIGS. 1 and 4), The "cyclone inside diameter", "cyclone length", and "cyclone volume" correspond to the inlet chamber 22, 22" (see FIGS. 1 and 4), While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A purge exhaust processor, comprising:
   an inlet chamber receiving a purge exhaust;
   a sump volume, a portion of the purge exhaust including at least one of moisture, air, and oil being passed from the inlet chamber to the sump volume;
   a heat source for changing a phase of the moisture from liquid to gas;
   a wick transferring the oil from the sump volume to an oil collector; and
   a vent to atmosphere in the sump volume.

2. The purge exhaust processor as set forth in claim 1, further including:

a tubing around the wick for disengaging the oil from the wick.

3. The purge exhaust processor as set forth in claim 1, wherein the wick is an oleophilic fiber.

4. The purge exhaust processor as set forth in claim 1, further including:
the vent in the sump volume for venting the moisture in the gas phase.

5. The purge exhaust processor as set forth in claim 1, further including:
an air outlet fluidly communicating with the inlet chamber, a necked-down portion of the air outlet creating a venturi effect for removing the moisture from the purge exhaust.

6. The purge exhaust processor as set forth in claim 1, further including:
an oil outlet port, the oil being transferred from the oil collector to the oil outlet port.

7. The purge exhaust processor as set forth in claim 1, wherein:
the purge exhaust is received into the inlet chamber at a velocity sufficient for creating a vortex of the purge exhaust in the inlet chamber.

8. The purge exhaust processor as set forth in claim 1, further including:
an inlet port directing the purge exhaust to enter and swirl within the inlet chamber, the swirling of the purge exhaust within the inlet chamber separating the at least one of the moisture and the oil from the air of the purge exhaust.

9. The purge exhaust processor as set forth in claim 8, wherein the inlet chamber includes:
an air outlet port for exhausting the air of the purge exhaust from the inlet chamber.

10. The purge exhaust processor as set forth in claim 9, wherein the inlet chamber includes:
an inlet chamber passage, the portion of the purge exhaust including at least one of the moisture and the oil being passed from the inlet chamber to the sump volume via the inlet chamber passage.

11. The purge exhaust processor as set forth in claim 10, wherein the inlet chamber passage is angled away from a direction of the purge exhaust swirl.

12. The purge exhaust processor as set forth in claim 11, wherein the inlet chamber passage is between about a 25° angle and about a 65° angle away from a direction of the purge exhaust swirl.

13. The purge exhaust processor as set forth in claim 10, wherein:
the inlet chamber includes angled walls for directing the portion of the purge exhaust including at least one of the moisture and the oil toward the inlet chamber passage.

14. The purge exhaust processor as set forth in claim 10, wherein:
the inlet port has a width between about 0.6" and 0.8" and a height between about 1.5" to about 2.0";
the inlet chamber has a length between about 5.0" and about 6.0" and a diameter between about 3.0" and about 4.0"; and
the air outlet port has a diameter between about 1.5" and 2.0".

15. The purge exhaust processor as set forth in claim 1, further including:
a divider in the sump volume creating a first sump sub-volume and a second sump sub-volume;
a sump passage between the first and second sump sub-volumes;
wherein the portion of the purge exhaust including at least one of the moisture and the oil is passed from the inlet chamber to the first sump sub-volume;
wherein the heat source is positioned in the first sump sub-volume; and
wherein the wick is positioned in the second sump sub-volume.

16. The purge exhaust processor as set forth in claim 15, further including:
a piston between the inlet chamber and the sump volume, the piston moving between a first closed position and a second open position as a function of a pressure created when the purge exhaust is received into the inlet chamber; and
the portion of the purge exhaust including at least one of the moisture and the oil is passed from the inlet chamber to the first sump sub-volume when the piston is in the open position.

17. A separator, comprising:
an inlet chamber receiving a purge exhaust;
a sump volume;
a sump passage, a portion of the purge exhaust including at least one of moisture and oil being passed from the inlet chamber to the sump volume via the sump passage;
a warming element for evaporating the moisture to separate the moisture from the oil;
an oleophilic filament for separating the moisture from the oil and transferring the oil from the sump volume to an oil collector; and
a vent to atmosphere in the sump volume.

18. The separator as set forth in claim 17, wherein the oleophilic filament is in a tubing for disengaging the oil from the oleophilic filament.

19. The separator as set forth in claim 17, further including:
the vent for exhausting the moisture from the sump volume.

20. The separator as set forth in claim 19, wherein the vent is an orifice in the sump volume.

21. The separator as set forth in claim 19, further including:
an outlet tube exhausting a portion of the purge exhaust including air and the moisture from the sump volume; and
an orifice in the outlet tube venting the moisture in the purge exhaust through a venturi effect.

22. A system for treating an exhaust, the system comprising:
an inlet chamber receiving the exhaust;
a sump volume, a portion of the exhaust including at least one of moisture and oil being passed from the inlet chamber to the sump volume;
a heat source for evaporating the moisture from the oil;
an oleophilic material for separating the oil from the moisture and for transferring the oil from the sump volume toward an oil outlet port of the sump volume;
a transfer device for assisting transfer of the oil from the oil outlet port to an oil collector; and
a vent in the sump volume for exhausting the evaporated moisture to atmosphere.

23. The system as set forth in claim 22, further including:
an air dryer, a purge output of the air dryer fluidly communicating with the inlet chamber, the exhaust received in the inlet chamber being a purge exhaust from the air dryer.

24. The system as set forth in claim 22, wherein:
the oil outlet port fluidly communicates with an associated compressor, the oil in the oil outlet port being recycled to the compressor.

25. The system as set forth in claim 22, further including:
a movable piston between the inlet chamber and the sump volume, the piston moving as a function of relative pressures in the inlet chamber and the sump volume;
wherein the transfer device is activated as a function of the movement of the piston.

26. The system as set forth in claim 22, further including:
an outlet tube exhausting a portion of the exhaust including air and the evaporated moisture; and
an orifice in the outlet tube venting the evaporated moisture through a venturi effect.

27. A purge exhaust processor, comprising:
an inlet chamber receiving a purge exhaust;
a sump volume, a portion of the purge exhaust including at least one of moisture and oil being passed from the inlet chamber to the sump volume;
means for changing a phase of the moisture from liquid to gas;
a vent in the sump volume for exhausting the moisture in the gas phase to atmosphere; and
means for transferring the oil from the sump volume to an oil collector.

28. The purge exhaust processor as set forth in claim 27, wherein the means for changing a phase of the moisture is a heat source.

29. The purge exhaust processor as set forth in claim 28, wherein the heat source is in the sump volume.

30. The purge exhaust processor as set forth in claim 27, wherein the means for transferring the oil is an oleophilic wick.

31. The purge exhaust processor as set forth in claim 30, wherein the means for transferring the oil further includes:
a tubing around the wick for increasing transfer of the oil from the wick.

* * * * *